US012693105B1

(12) United States Patent
Sudberry

(10) Patent No.: US 12,693,105 B1
(45) Date of Patent: Jul. 28, 2026

(54) GAUGING TAPE

(71) Applicant: Mark E Sudberry, Trophy Club, TX (US)

(72) Inventor: Mark E Sudberry, Trophy Club, TX (US)

( * ) Notice: Subject to any disclaimer, the term of this patent is extended or adjusted under 35 U.S.C. 154(b) by 323 days.

(21) Appl. No.: 18/234,789

(22) Filed: Aug. 16, 2023

Related U.S. Application Data

(63) Continuation-in-part of application No. 29/834,318, filed on Apr. 11, 2022, now Pat. No. Des. 1,079,504.

(51) Int. Cl.
| | |
|---|---|
| *G01B 3/1003* | (2020.01) |
| *G01B 3/1071* | (2020.01) |
| *G01B 3/1092* | (2020.01) |

(52) U.S. Cl.
CPC ......... *G01B 3/1003* (2020.01); *G01B 3/1092* (2020.01); *G01B 2003/1076* (2013.01)

(58) Field of Classification Search
CPC ............... G01B 3/1003; G01B 3/1092; G01B 2003/1076
See application file for complete search history.

(56) References Cited

U.S. PATENT DOCUMENTS

| | | | | |
|---|---|---|---|---|
| 642,888 | A | * | 2/1900 | Vliet ...................... G01C 15/10 |
| | | | | 33/420 |
| 1,248,435 | A | * | 11/1917 | Anderson ............ G01B 3/1056 |
| | | | | 33/770 |

| | | | | |
|---|---|---|---|---|
| 1,340,712 | A | * | 5/1920 | Hare ........................ G01B 3/11 |
| | | | | 242/405 |
| 2,471,329 | A | * | 5/1949 | Keuffel ................ G01B 3/1003 |
| | | | | 427/210 |
| 3,568,322 | A | * | 3/1971 | Showers .................. G01C 9/34 |
| | | | | 33/413 |
| 3,913,233 | A | * | 10/1975 | Marcell ................ G01B 3/1056 |
| | | | | 33/770 |
| 3,936,944 | A | * | 2/1976 | Byne .................... G01B 3/1004 |
| | | | | 33/759 |
| D248,456 | S | * | 7/1978 | DeLuca ......................... D10/71 |
| 5,056,234 | A | * | 10/1991 | Han ......................... B25H 7/00 |
| | | | | 33/759 |
| 6,101,734 | A | * | 8/2000 | Ten Caat ............. G01B 3/1071 |
| | | | | 33/770 |
| 6,860,031 | B2 | * | 3/2005 | Odachowski ........ G01B 3/1041 |
| | | | | 33/759 |
| 6,935,040 | B2 | * | 8/2005 | Alrutz .................... H02G 11/02 |
| | | | | 33/759 |

(Continued)

FOREIGN PATENT DOCUMENTS

| | | | | |
|---|---|---|---|---|
| DE | 20002283 | U1 | * | 4/2000 ............... G01B 3/02 |
| GB | 2372572 | A | * | 8/2002 ........... G01B 3/1004 |

*Primary Examiner* — Yaritza Guadalupe-Mccall
(74) *Attorney, Agent, or Firm* — Richard Eldredge; Leavitt Eldredge Law Firm

(57) ABSTRACT

A gauging tape, comprising a flat double-sided tape including side one with a white background and black lettering and side two with a black background and white lettering. The lettering of the gauging tape is configured to be placed in a horizontal position on side one and side two in relation to the width of the gauging tape, wherein the flat double-sided tape comprises a plumb bob hook or a claw hook on one end. The gauging tape with horizontal markings can be used to gauge the level of fluid or oil in a container or for physical measurement such as pipe tallying.

3 Claims, 7 Drawing Sheets

(56)            References Cited

U.S. PATENT DOCUMENTS

| | | | | |
|---|---|---|---|---|
| 7,617,616 | B1 * | 11/2009 | Berg ................... | G01B 3/1003 |
| | | | | 33/759 |
| 8,590,168 | B2 * | 11/2013 | Abdel-Rahman .... | A61B 5/1072 |
| | | | | 33/512 |
| 8,863,399 | B2 * | 10/2014 | Steele ................. | G01B 3/1003 |
| | | | | 33/679.1 |
| 11,320,249 | B2 * | 5/2022 | Hall ....................... | G01B 3/006 |
| D984,912 | S * | 5/2023 | Huggart ......................... | D10/71 |
| D1,009,659 | S * | 1/2024 | Boyer ............................ | D10/71 |
| D1,043,381 | S * | 9/2024 | Roby ............................. | D10/71 |
| D1,079,504 | S * | 6/2025 | Sudberry ........................ | D10/71 |
| 2008/0307666 | A1 * | 12/2008 | Mattsson ................. | G01B 3/10 |
| | | | | 33/759 |
| 2010/0269363 | A1 * | 10/2010 | Chang .................. | G01B 3/1003 |
| | | | | 33/759 |
| 2017/0343331 | A1 * | 11/2017 | Drury, Sr. ............ | G01B 3/1003 |
| 2025/0244117 | A1 * | 7/2025 | Peynado .............. | G01B 3/1056 |

* cited by examiner

100

22 Point —————————→  ←——— 22 Point
Helvetica Neue                               Helvetica Neue
Condensed Black                              Condensed Bold
Character Spacing - 15%                      Character Spacing - 15%

9 Point ———————————→  ←——— 22 Point
Helvetica Neue                               Helvetica Neue
Condensed Black                              Condensed Black
Character Spacing - 5%                       Character Spacing - 15%
Baseline Shift 7pt 9 Point Space

GAUGING TAPE

BACKGROUND

1. Field of the Invention

The present invention relates generally to an oilfield gauging tape, and more specifically to a gauging tape with horizontal markings, displayed in an inverted position to the length of the tape.

2. Description of Related Art

The use of a gauging tape is well known in the art and are effective means to measure the levels of oil in a tank. The conventional gauge tapes use innage and outage methods to manually measure the fluid levels in a tank. Innage is the more common method and involves lowering the tape into a tank until the tip of the plumb bob reaches the bottom. When the tape is reeled in, the height of the fluid in the tank is read by seeing where the tape is wet and visually discolored by the fluid. The outage method involves measuring the empty distance from the surface of a fluid in a tank to the top of the tank and subtracting it from the total depth of the tank.

One of the problems commonly associated with conventional gauging tape is the awkward standing position required and the twisting of the head and neck in reading the markings on the tape. Due to this increased human effort, injury can be caused by overuse and repetitive bending, twisting, and turning head and neck to read the measurement markings.

Accordingly, although great strides have been made in the area of oilfield gauging tape, many shortcomings remain.

DESCRIPTION OF THE DRAWINGS

The appended claims set forth the novel features believed characteristic of the embodiments of the present application. However, the embodiments themselves, as well as a preferred mode of use, and further objectives and advantages thereof, will best be understood by reference to the following detailed description when read in conjunction with the accompanying drawings, wherein:

Figure 1:
FIG. 1 is a double-sided gauging tape according to the present invention.
Figure 1:
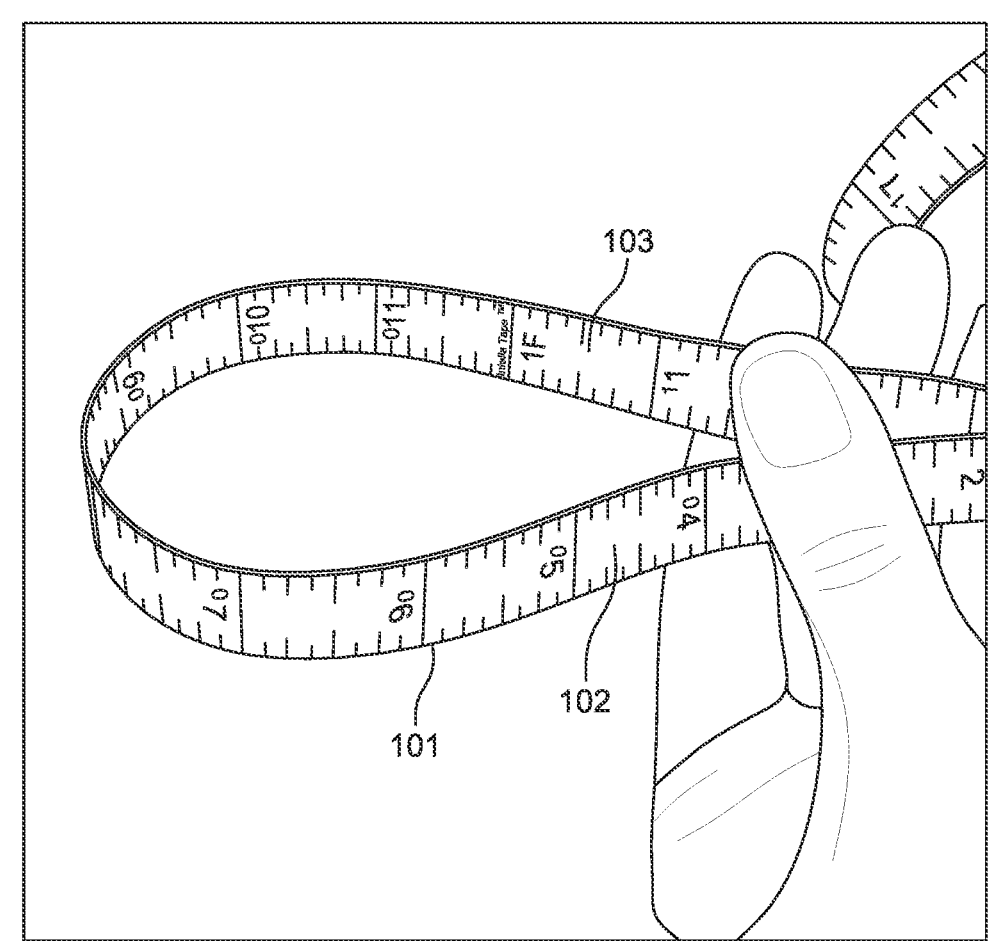
Figure 2:
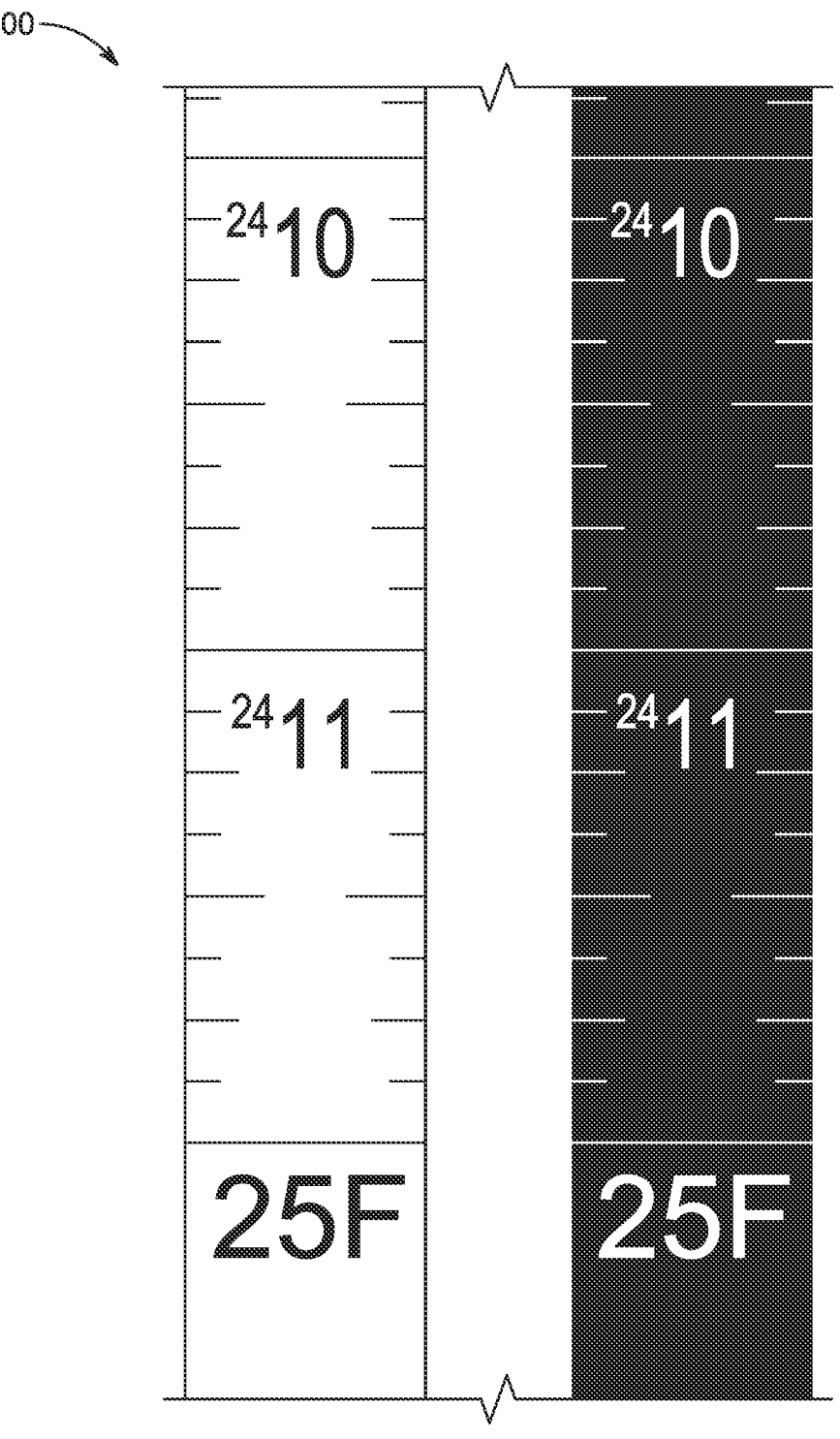
FIG. 2 is a double-sided tape with horizontal markings on distinctive opposing colors such as the black and white sides of the gauging tape.

While the gauging tape and method of use of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the gauging tape and the method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The gauging tape and method of use in accordance with the present application overcome one or more of the above-discussed problems commonly associated with conventional gauging tapes. Specifically, the gauging tape of the present invention prevents twisting and turning of the head while taking readings by providing a double-sided gauging tape in contrasting colors with horizontal measurement markings. The gauging tape of the present invention is provided with white background with black letters for dark fluids on one side of the tape and black background with white letters for clear fluids on another side of the tape. The gauging tape of the present invention is lighter in weight and extremely flexible and durable being suitable for all kinds of fluids in dark and light colors and easier and safer to use.

These and other unique features of the gauging tape and method of use are discussed below and illustrated in the accompanying drawings.

The gauging tape and method of use will be understood, both as to its structure and operation, from the accompanying drawings, taken in conjunction with the accompanying description. Several embodiments of the gauging tape are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein reference characters identify corresponding or similar elements throughout the several views, FIGS. 1-8 depict the gauging tape in accordance with a preferred embodiment of the present application. It will be appreciated that gauging tape 100 overcomes one or more of the above-listed problems commonly associated with conventional gauge tapes. In addition, it should be appreciated that more or fewer of such components may be included in different embodiments of the gauging tape 100.

In the contemplated embodiment, gauging tape 100 includes a flat double-sided tape 101 including side 102 with white background and black lettering and side 103 with black background and white lettering. The lettering of the gauging tape is configured to be placed in horizontal position on side 102 and side 103 in relation to the width of the gauging tape 100.

It is also contemplated and will be appreciated that the flat double-sided tape 101 of the gauging tape 100 can be made of stainless steel or equivalent and is resistant to corrosion. The flat double-sided tape 101 can be ½" wide and 0.01" thick, can be tempered for flexibility, and has a durable coating to withstand corrosive substances.

Figure 3:
FIG. 3 is a representation of the preferred marking style of the gauging tape of the present invention.
Figure 3:
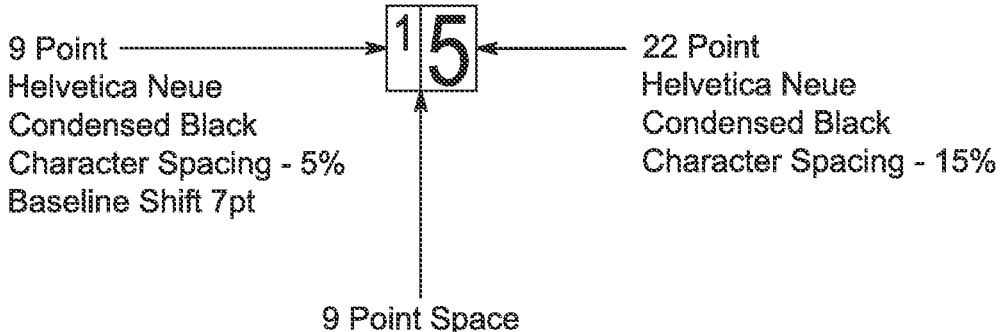
Figures 6, 7:
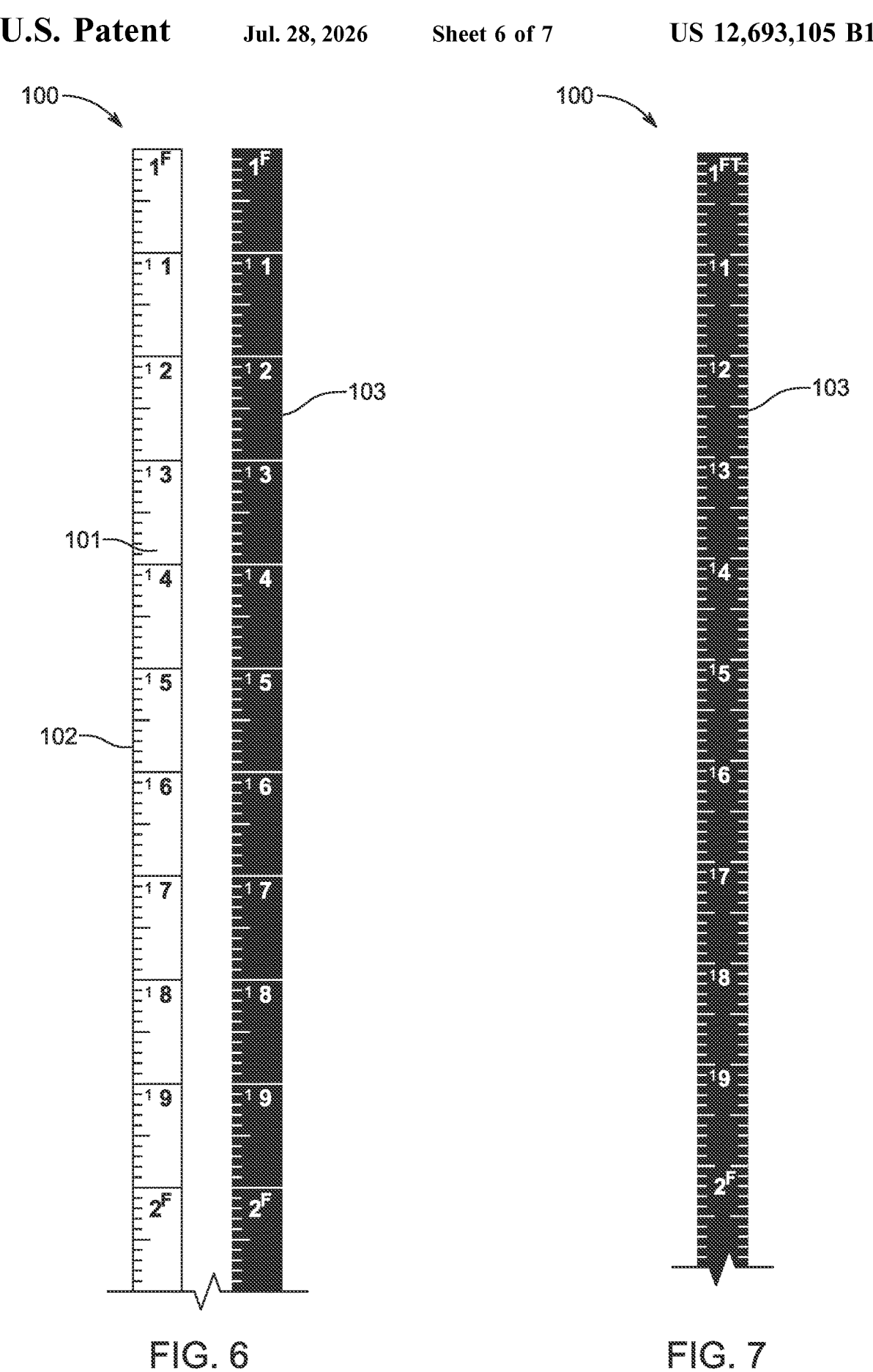
FIG. 6 is a double-sided tape, illustrating the preferred horizontal marking style in contrasting colors.
FIG. 7 is a double-sided tape, illustrating the preferred horizontal marking style in 10ths of an inch.

The gauging tape 100 can be configured to be held in the form of a reel with a plumb bob hook or a claw-type hook connected through a corrosion-proof hook and swivel to one end of the double-sided tape. The double-sided tape 101 of the present invention can be protected on both ends by corrosion-proof rivets. The double-sided tape 101 of the present invention as shown in FIG. 3 and FIGS. 6-7 comprises markings in a horizontal position for 10ths of an inch or each foot in 22-point font size and Helvetica neue font type in condensed black color with 15% character spacing for number markings and 22-point font size and Helvetica neue font type in condensed bold color with 15% character spacing for alphabetical markings. The double-sided tape 101 of the present invention comprises markings in the horizontal position for each inch in 9-point font size and Helvetica neue font type in condensed black color with 5% character spacing and baseline shift 7 point for superscript number markings and 22-point font size and Helvetica neue font type in condensed black color with 15% character spacing for number markings as shown in FIGS. 1-4. The superscript number markings indicate the corresponding foot length markings and the regular number markings indicate the corresponding inch length markings.

Figure 4:
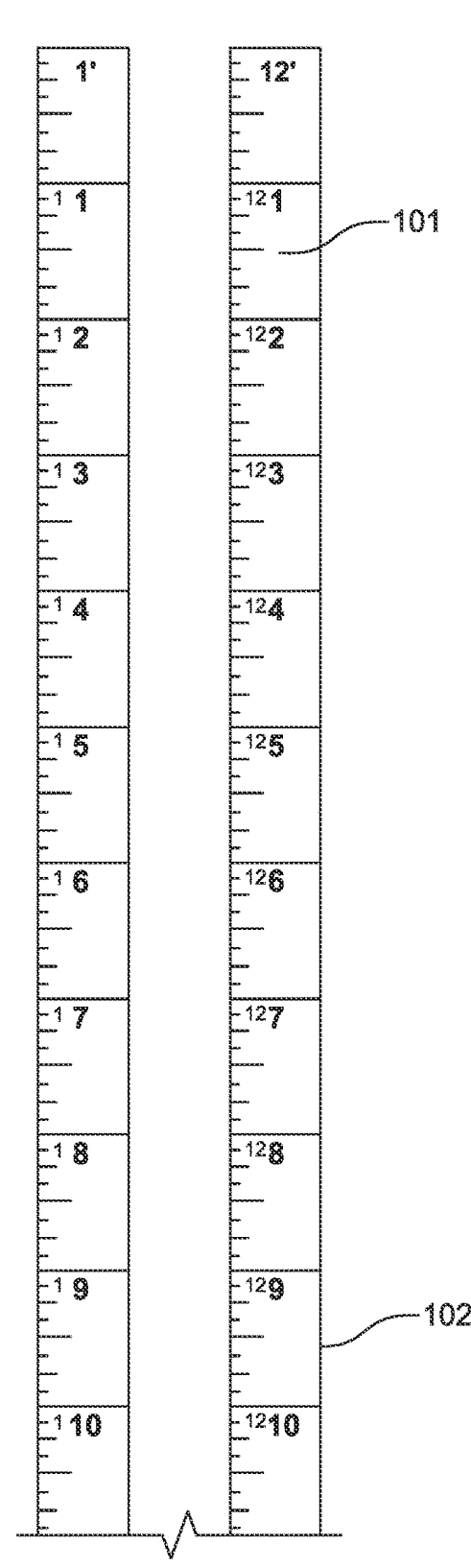
FIG. 4 is another example of a double-sided tape, illustrating the preferred horizontal marking style.

The gauging tape 100 may further be configured to comprise horizontal markings on the flat double-sided tape 101 as shown in FIG. 4 and FIGS. 6-7, with the brand name printed at every foot marker, a statement indicating the patent status at 1-foot marking, 12-foot marking, and at 25-foot marking. The gauging tape 100 of the present invention may comprise the side tick markings on one or both sides of the double-sided tape. The flat double-sided tape 101 of the present invention may preferably comprise the side tick markings on one side facilitating more space for markings in larger font, as shown in FIG. 4.

The gauging tape 100 may further comprise foot length marking in regular numbers approximated with a single apostrophe for each corresponding foot length marking as shown in FIG. 4 and FIGS. 6-7.

The gauging tape 100 may further comprise measurement markings in imperial and metric standards of measurement as needed.

The gauging tape 100 of the present invention can be used to gauge levels of fluids including but not limited to oil or other dark or light-colored fluids in a container.

Figure 8:
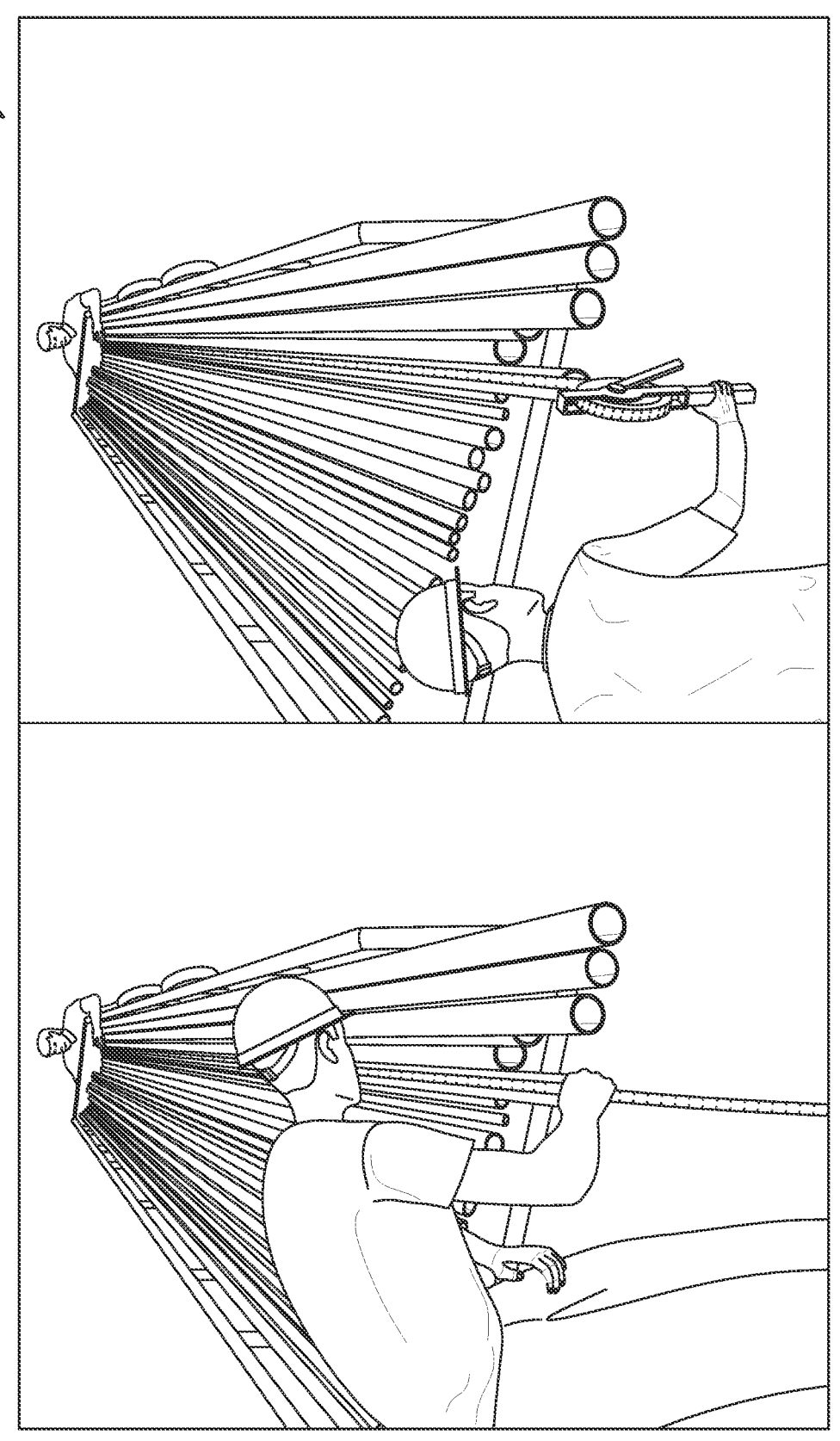
FIG. 8 shows the usage of the gauging tape, for measuring pipe length or tallying on a pipe rack.

In the contemplated embodiment as shown in FIGS. 6-8, a further example of the novel use of horizontal markings on a measuring tape is through the use of the style and tape of the present invention as a pipe tally tape. This type of tape measure is used for accurately measuring total pipe length. When servicing or drilling a well, each pipe section has to be measured individually, recorded and logged known as a pipe tally. To make adding pipe sections of varying lengths together easier to add together for a total length, a double-sided gauging tape is marked in 10ths of an inch.

However, when measuring the individual pipes such as on a pipe rack as shown in FIG. 8, the operator has to turn and twist the body to get an accurate reading from a tape with standard right-to-left markings. Ultimately this also causes the body to come in contact with or bump into the ends of the pipes on the rack, since most pipes are not of the same exact length, the ends protrude at random lengths.

Furthermore, most pipe has a lubricant or pipe dope on the ends to protect the threads and by the operator having to lean in and touch the ends of the pipe to read the measurement reading his clothes become soiled with this lubricant. The horizontal markings on the double-sided pipe gauging tape eliminate this from occurring as the operator stands up straight and at a right angle to the pipe while taking a more accurate reading. Thus, taking measurements with the double-sided pipe gauging tape is a much more natural safe, clean, and successful process of pipe tallying i.e., measuring pipe length.

It should be appreciated that one of the unique features and characteristics of the present invention is that the double-sided tape with horizontal markings can be used for any kind of gauging purposes including but not limited to gauging the levels of fluids in a container or for measuring the length of pipes or pipe tallying.

Figure 5:
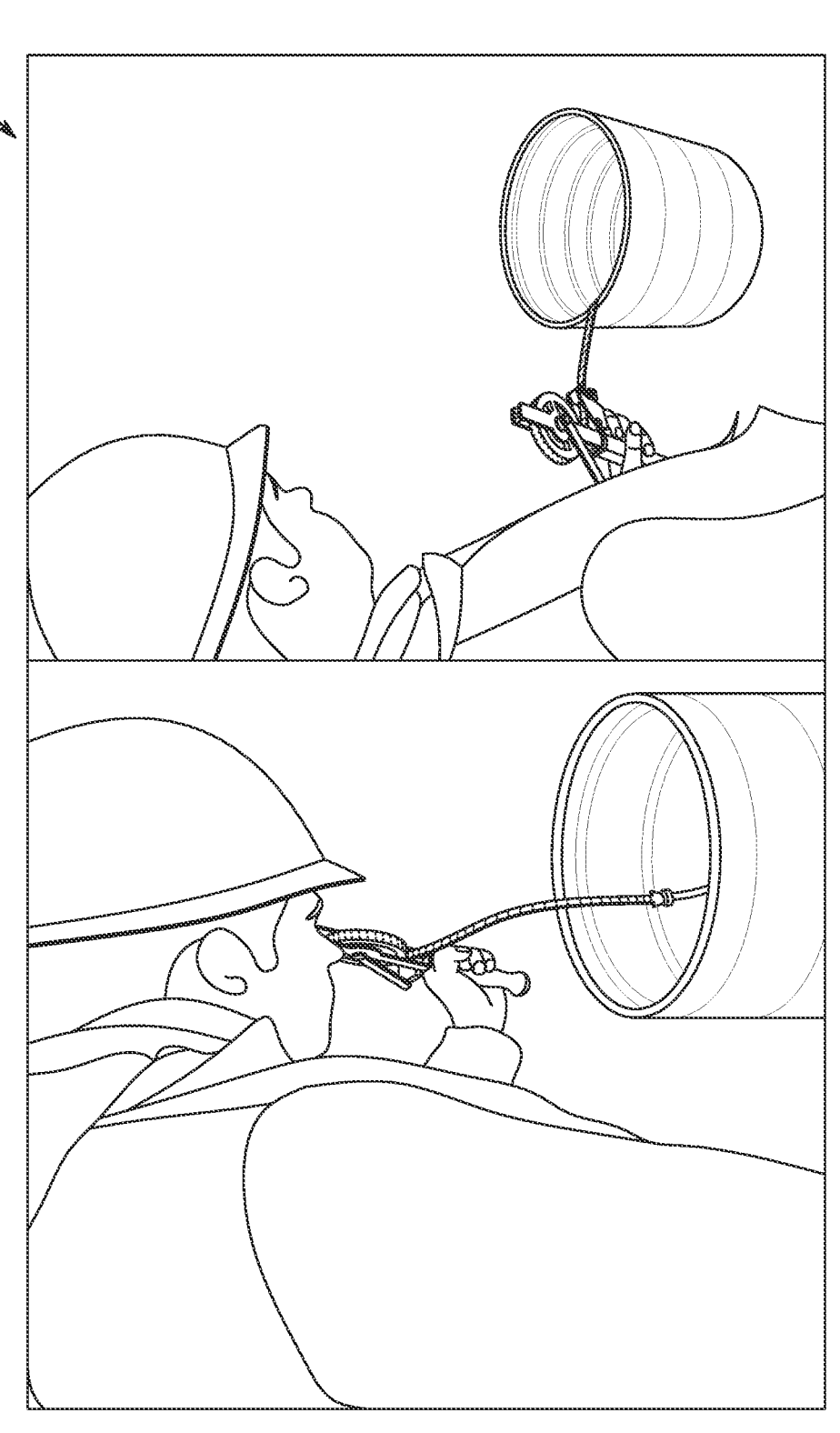
FIG. 5 shows the difference between using the conventional method and the gauging tape of the present invention.

It should also be appreciated that one of the unique features and characteristics of the present invention is that the contrasting colors and horizontal markings are much easier to read, resulting in a more easy, efficient, accurate, and safer performed task when used by people with either right-handedness or left-handedness. Also, it minimizes the potential of fluids dripping off from the gauging tape further minimizing physical health hazards at the workplace. It also reduces human effort in taking the readings from the tape eliminating repetitive bending, turning, and twisting the head while reading the measurements without soiling the clothes. Further, by being able to maintain standing in an upright position to take the measurement readings, this avoids repetitive task injury and is hence to be considered as safer to use and non-hazardous in terms of occupational health and safety, as shown in FIG. 5 and FIG. 8.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A gauging tape, comprising:
a flat double-sided tape including side one with a white background and black lettering and side two with a black background and white lettering;
a first marking on a surface of the flat double-sided tape that outlines a position for a fraction of an inch;
a second marking positioned adjacent to the first marking that outlines a foot, the second marking having a different font size than the first marking;

wherein the lettering on the gauge tape is configured to be placed in a horizontal position of the said side one and said side two in relation to the width of the gauging tape.

2. The gauging tape of claim 1, wherein the flat double-sided tape comprises a plumb bob hook on one end for gauging the fluid levels in a container.

3. The gauging tape of claim 1, wherein the flat double-sided tape comprises a claw hook on one end to measure the length of a physical object such as the length of a pipe or pipe tallying.

\*  \*  \*  \*  \*